Patented Apr. 15, 1952

2,592,926

UNITED STATES PATENT OFFICE 2,592,926

HALOGEN-CONTAINING RESINS STABILIZED WITH POLYMERIC ORGANO-TIN DIALKOXIDES

Gerry P. Mack, Jackson Heights, and Emery Parker, New York, N. Y., assignors to Advance Solvents & Chemical Corporation, New York, N. Y.

No Drawing. Application October 29, 1948, Serial No. 57,425

18 Claims. (Cl. 260—45.75)

The invention relates to stabilized halogen-containing resins and compositions containing the same.

It is well known that certain organic tin compounds are stabilizing agents for preventing the discoloration which halogen-containing resins, for instance vinyl chloride polymers and copolymers, develop after a prolonged exposure to heat and light. The normal processing temperatures employed for compounding such resins are frequently as high as 300–345° F. and have to be maintained for a length of time of twenty minutes to an hour and possibly even longer. Considering these high temperatures and the physical and chemical characteristics of the tin compounds used heretobefore as stabilizers, it will be readily understood why the known tin stabilizers have not been fully satisfactory.

The tin compounds proposed heretobefore as stabilizers belong mainly to the groups of tetra alkyl or aryl tin compounds or organo-tin salts of carboxylic acids.

Tetra alkyl tin compounds have a relatively high vapor pressure and, therefore, the tendency to volatilize when the resins containing the same are subjected to elevated temperatures for a prolonged time. In addition, such compounds having low molecular weight alkyl groups are quite volatile and exhibit some toxicity, while higher molecular weight alkyl groups having eight carbons or more are not very compatible with vinyl and similar resins.

Tetra aryl tin compounds, on the other hand, are not suitable as stabilizers because they are insoluble in vinyl resins and, therefore, tend to crystallize out and render the products hazy.

The organo-tin salts of lower aliphatic acids, for instance dibutyl tin diacetate, are very volatile already at temperatures above 300° F. During compounding with vinyl halide polymers they break down and give off very strong acetic acid fumes, which at these high temperatures are very objectionable to the workmen. Also, the strong odor of acetic acid is carried through to the finished compound or film and this too is objectionable.

The same objection is true of organic tin compounds of medium molecular weight carboxylic acids, such as butyric, valeric caproic and similar acids, which transmit their strong objectionable odors to the finished stabilized products.

Another disadvantage of the organo-tin salts of lower aliphatic acids is that they are somewhat soluble in water and hydrolyze in the presence of water. Dibutyl tin diacetate, for instance, will slowly decompose to acetic acid and dibutyl tin oxide. This sensitivity to water makes these stabilizers unsuitable for application in vinyl films exposed to water and humidity. For the same reason, the organo-tin salts of lower aliphatic acids cannot be used as stabilizers in the recently developed vinyl halide latices, because they immediately hydrolyze upon contact with water forming tin salts, which react with the usual ionic type emulsifier used in producing vinyl emulsions and thus destroy or coagulate the emulsion.

To overcome the disadvantages inherent in the use of organo-tin salts of the lower aliphatic acids, particularly the acetate, it has been proposed to use organo-tin salts of the higher fatty acids such as the laurate. Though it is true that these compounds are less volatile than the corresponding salts of the lower aliphatic acids, they have a number of other drawbacks.

It is well known that higher fatty acids when exposed to higher temperatures have a tendency to yellow, and it appears that the organo-tin derivatives maintain this tendency. When, for instance, vinyl chloride resins stabilized with dibutyl tin dilaurate are processed for any length of time, the films become somewhat yellow, which has been attributed to the laurate radical.

A further drawback of the organo-tin salts of higher fatty acids is that with increasing length of the carboxylic acid chain the compatibility of the salts with vinyl halide resins is decreased. If, for instance, dibutyl tin dilaurate is used in amounts of more than 2–3%, it has the tendency to exude or sweat out, giving an oily or greasy film. This sweating out or blooming in the vinyl films is very objectionable for many reasons and is particularly objectionable since these films when they have an exudation will not heat seal or will give a very poor heat seal due to the blooming of the stabilizer. Further, in the case of printing such films, where articles of the type of shower curtains, table cloths and other decorative items are contemplated, the exudations will interfere with the printing process and prevent good adhesion of the printing inks to the vinyl film itself.

The incompatibility of the organo-tin salts of higher fatty acids with vinyl halide resins has the further undesirable result that films prepared from such stabilized resin show a slight haze instead of the clarity desirable in such films.

Organo-tin salts of dicarboxylic acids are somewhat water soluble; they increase the water sensitivity of the resins into which they are incorporated and have, in this particular, the same disadvantages as outlined with respect to the organo-tin salts of the lower aliphatic acids.

The principal object of this invention is to provide resinous compositions stabilized with new groups of organo-tin compounds which are free of the drawbacks inherent in the known tin stabilizers and which prevent discoloration and haziness of halogen-containing resins during the processing as well as in the finished products, such as films, sheets, or molded articles, when exposed to heat and light.

We have found a new class of organo-tin compounds which fully satisfy the recited conditions. These compounds probably correspond to the general formula:

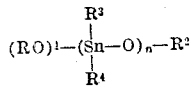

wherein $RO^1$ is an aliphatic, alicyclic or aryl alkoxy radical, $R^2$ is the residual alkyl, alicyclic or aryl radical of the $(RO)^1$ prime group and $R^3$ and $R^4$ stand for members of the group consisting of alkyl and aryl and where $n$ designates the degree of polymerization. The compounds will in most cases be present in the form of mixtures comprising different degrees of polymerization, in which case $n$ will be not an integer but a fraction having a value higher than 1.

According to their preparation, the organo-tin compounds represented by the formula may be designated as polymeric dialkyl, diaryl, and alkyl aryl tin dialkoxides. They are colorless and inoffensive substances soluble in a variety of organic solvents and fully compatible with halogen-containing resins, with which they form completely homogeneous masses. Even when under excessive thermal conditions, some of the terminal alkoxide groups should be split off, the thus-formed split products remain compatible with the resins, i. e., they hardly affect the transparence of the film and do not develop obvious odors.

The stabilizers according to the invention have many desirable features and none of the drawbacks listed hereinbefore for the known tin stabilizers. They are of particular value in making what is known as rigid vinyl sheeting where only small amounts of plasticizer are used and where good clarity approaching optical glass is desirable. Further, their use is particularly effective for thin films or sheetings which are to be printed on, as they do not interfere with the printing processes, and for heat sealing films to be used in packages and other industrial purposes.

The new stabilizers are also very useful in making artificial leather where their outstanding resistance to destructive light rays has a great advantage, particularly where such upholstery is exposed to the outdoor elements. Further specific uses are beverage hoses where great clarity and freedom from taste and odor are needed, belt stocks for apparel and other articles such as wristwatch bands, sheeting of film for food packing, and many others.

Tin dialkoxides may be made by reacting dialkyl, diaryl, or alkyl aryl tin dihalides in an anhydrous organic solvent with alkali metal alkoxides, or with alcohol in the presence of ammonia or tertiary amines and removing the precipitated chloride and the solvent; the polymers are directly obtained by carrying out these reactions or removing the solvent at higher temperatures.

Examples of dialkyl or diaryl tin halides which may be employed in making the alkoxides include dimethyl tin dichloride, diethyl tin dichloride, dibutyl tin dichloride, diamyl tin dichloride, dioctyl tin dichloride, diphenyl tin dichloride, dibenzyl tin dichloride, ditolyl tin dichloride, dixylyl tin dichloride, dinaphthyl tin dichloride, and others as well as the corresponding dibromides.

As alcohols we can use saturated or unsaturated primary, secondary or tertiary aliphatic or alicyclic alcohols such as methanol, ethanol, allyl alcohol, butanol, propanol, 2-ethyl hexanol, lauryl alcohol, methyl isobutyl carbino, tertiary butyl alcohol, cyclohexanol, methyl cyclohexanol, dimethyl cyclohexanol, hydroabietyl alcohol, tetrahydrofurfuryl alcohol, and others. We may also employ alcohols of which the hydrocarbon chain is interrupted by oxygen or sulphur. Ether alcohols and thioether alcohols are examples of such compounds.

Also aromatic alcohols such as benzyl alcohol, phenyl ethyl alcohol, cinnamyl alcohol may be used provided they are true alcohols and not phenols.

Lower polymeric organo-tin dialkoxides are soluble at room temperature in alcohols, in aromatic hydrocarbons such as benzene, toluene, xylene, and also in halogenated aliphatic and aromatic hydrocarbons and ethers such as ethylene dichloride, carbon tetrachloride, dichloroethylether, benzene monochloride and others. The higher polymers are soluble in the same solvents at elevated temperatures with exception of the alcohols in which they are insoluble and which allows the separations from the lower polymers and monomers. This solubility permits of mixing the polymeric organo-tin dialkoxides intimately with the halogen-containing resins.

We prefer to prepare the new stabilized resinous compositions by dispersing the polymeric tin dialkoxides intimately within the resin to be stabilized. It is, however, also possible to incorporate monomeric tin dialkoxides in the resin and to convert subsequently the monomer within the resin by suitable methods, for instance by a heat treatment, preferably in the presence of water vapor, wholly or in part into the polymers. We have found it advisable to use as stabilizers polymerized dialkoxides which no longer contain substantial amounts of the free tin halides used as starting material, since such tin halides may catalyze the decomposition of vinyl resins.

On the other hand, smaller amounts of chlorides formed during the preparation and remaining in the polymerizates appear to have no harmful effects on their stabilizing properties.

In view of their good compatibility with halogen-containing resins and their relatively low vapor pressure the polymeric tin dialkoxide stabilizers of this invention are also well suited for use in compounding organosols and plastisols. The need for a relatively non-volatile stabilizer with excellent heat and light resistance is of great importance in such compounds, for this technique of compounding resins depends on the ability to fuse or flux deposits of film from the organosols or plastisols at relatively high temperatures and in order to prevent the discoloration of the vinyl compositions at these high temperatures a good heat stabilizer which is non-volatile and will not come out of the film during fusing or fluxing is necessary.

Further, tin dialkoxide polymers are quite resistant to water hydrolysis as compared to the rapid hydrolysis of the alkyl tin carboxylic salts. This better resistance of the alkoxides makes them useful as stabilizers for vinyl latices which are based on vinyl chloride and other modifying copolymers provided that such latices are not highly alkaline. Usually such latices contain an ionic type of emulsifier having a pH of approximately 7, and therefore if the alkoxide type compounds are emulsified with non-ionic type emulsifiers they can then be added to the vinyl latices without destroying or coagulating the latices, which happens when the alkyl tin carboxylic salts are used.

As will be seen from a consideration of the general formula attributed hereinbefore to the polymeric tin dialkoxides, these compounds are characterized by a configuration containing a plurality or chain of

groups, and they may be regarded as particularly effective representatives of this broader class of stabilizers. According to such classification, the new stabilizers may be termed derivatives of polystannanediols

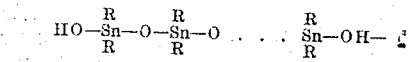

in which the terminal hydroxyl groups are substituted by organic groups. The polymeric tin dialkoxides of the invention may be considered as polystannanediols in which the terminal hydroxyl groups are replaced by alkoxy groups, and may be designated as ethers of a polyanhydrostannanediol.

Halogen-containing resins, which are made heat and light resistant by the stabilizers of this invention, include polymers of vinyl chloride; copolymers of vinyl chloride with vinyl esters of aliphatic acids, particularly vinyl acetate; copolymers of vinyl chloride with esters of acrylic and methacrylic acids, and with acrylonitrile; copolymers of vinyl chloride with diene compounds and unsaturated dicarboxylic acids or their anhydrides, such as copolymers of vinyl chloride with diethyl maleate, diethyl fumarate or maleic anhydride; after-chlorinated polymers and copolymers of vinyl chloride; polymers of vinylidene chloride and copolymers of the same with vinyl chloride and other polymerizable compounds; polymers of vinyl chloroacetate and dichlordivinyl ether; chlorinated polymers of vinyl acetate; chlorinated polymeric esters of acrylic and alpha-substituted acrylic acids; polymers of chlorinated styrenes, for instance dichlorostyrene; chlorinated rubber; chlorinated polymers of ethylene; polymers and after-chlorinated polymers of chlorobutadienes, and their copolymers with vinyl chloride; rubber hydrochloride and chlorinated rubber hydrochloride; and mixtures of the polymers recited herein with each other or other polymerizable compounds. The corresponding bromides and brominated products are equally well stabilized.

The following examples will serve to illustrate the invention.

*Example 1*

1.05 grams of dibutyl dimethoxy tin, obtained by reacting dibutyl tin dichloride with sodium methoxide in a toluene solution and separating the reaction product from the precipitated sodium chloride and the solvent, were incorporated in a solution containing a mixture of 100 grams of vinyl chloride-vinyl acetate copolymer and 40 grams of dioctylphthalate in acetone butyl acetate. The vinyl copolymer contained 90 per cent of vinyl chloride and 10 per cent of vinyl acetate and had an intrinsic viscosity in cyclohexanone at 20° C. of .79.

The films prepared from this solution remained completely clear when heated for 30 to 45 minutes at 160° to 170° C. and no discoloration of the films took place. The films containing no tin polymer stabilizer when similarly treated turned dark brown.

Similar results were obtained when the dibutyl tin dimethoxide was replaced by dimethyl tin dimethoxide. In both cases, the stabilizer contained about 85 per cent of lower polymers, the balance being monomeric tin dialkoxide.

*Example 2*

Sodium butoxide was prepared by dissolving metallic sodium in n-butyl alcohol. 18.5 grams of the obtained sodium butoxide were suspended in toluene and allowed to react with 30.4 grams of dibutyl tin dichloride at 0° to 5° C. under cooling until the reaction mixture was neutral. The precipitated sodium chloride was filtered off and the solvent was then removed by distillation under reduced pressure. The residue was purified by washing with methyl alcohol, and then treated with hot moist air. Such treatment with water vapor at moderately elevated temperatures has been found to be a convenient way to accelerate the conversion of organo-tin dialkoxide monomers and lower polymers to the higher polymers.

One per cent by weight of the thus obtained polymeric dibutyl dibutoxy tin was dissolved in a 12.5% solution of a vinyl chloride-vinyl acetate copolymer resin in methylethylketone, containing 35% of dioctylphthalate calculated on the resin. The conjoint polymer consisted of 87 per cent of vinyl chloride and 13 per cent of vinyl acetate and had an intrinsic viscosity in cyclohexanone of 1.36 at 20° C.

The film cast from this solution was thoroughly dried and then heated for 30 minutes at 165° C.; no discoloration could be observed. A corresponding film containing no tin polymer stabilizer turned dark brown when similarly treated.

Similar results were obtained when the polymeric dibutyl tin dibutoxide was replaced by a polymerized di-n-amyl tin dipropoxide.

*Example 3*

A low-polymeric diethyl tin diethylhexoxide was obtained by reacting diethyl tin dichloride with sodium 2-ethyl hexoxide in the manner described in the preceding example. Three parts of this stabilizer were milled with 61.5 parts of a vinyl chloride-vinyl acetate copolymer (95% vinyl chloride, 5% vinyl acetate, I. V. 1.53) and 36.5 parts of dioctylphthalate on a rubber mill until a smooth uniform film was obtained. From this film, pieces were cut 6 inch by 6 inch, $\frac{3}{16}$ inch thick and heat-pressed at 345° F. for 10 minutes. A very slight yellow discoloration took place, whereas without the stabilizer a tannish color was obtained.

*Example 4*

100 grams of a joint polymer containing approximately 90% vinyl chloride and 10% diethyl maleate were mixed with 40 grams of dioctyl sebacate and 1.2 grams of diethyl tin dibutoxyethoxide stabilizer at a polymerization degree of about 11-12. After continuous milling for forty minutes on a standard rubber mill at 350° F. no appreciable discoloration was observed, whereas without stabilizer the composition turned a gold color.

Example 5

100 parts of a vinyl chloride-vinylidene chloride copolymer containing 85 per cent of vinyl chloride and 15 per cent of vinylidene chloride were milled at 310° F. for 35 minutes with 40 parts of 2-ethyl hexylphthalate and 1½ parts of a low polymerized dibutyl tin dialloxide. Only a very slight discoloration took place, in contradistinction to similar mixes containing no stabilizer.

Example 6

Two parts of polymeric dibutyl tin dicyclohexoxide were incorporated in a mix containing 100 parts of a joint polymer of 60% of vinyl chloride and 40% of acrylonitrile and 25 parts of dioctyl phthalate. The film was cast out of acetone solution and even before heat treatment was a gold color. After heating a thin film at 315° F. for a period of thirty minutes the film without stabilizer turned a brown color, whereas with the alkoxide stabilizer the original yellow color was maintained without any appreciable change.

Example 7

A natural chlorinated rubber composition containing 67 per cent of chlorine and having a viscosity of 20 centipoises was heated for 30 minutes at 140° C. with 4 per cent of dibutyl tin dibenzoxide. A very slight straw color was observed whereas the composition without the stabilizer assumed a dark yellow color.

Example 8

100 parts of polymerized vinyl chloride were ground with 60 parts of dioctylphthalate and 100 parts of a solvent consisting of 20 per cent of diisobutyl ketone and 80 per cent of xylene until a very fine dispersion was obtained. The obtained vinyl organosol was coated upon a textile fabric support which was heated for 5 minutes at 350° F. until a homogeneous film was obtained on the support. The film showed a yellow shade which darkened upon further heating.

When 3 parts of polymerized dibutyl tin dibutoxide were incorporated in the same resin composition, the obtained film remained clear and practically colorless and remained that way even upon prolonged heating.

Example 9

A vinyl latex which basically was a vinyl chloride polymer with approximately 50% solids was compounded as follows: 2 parts of a dibutyl tin dimethoxide polymer were dissolved in 40 parts of dioctyl phthalate at a temperature of 90° C. and to this was added 4 parts of a non-ionic type emulsifier, which can be described chemically as alkylated phenol reacted with ethylene oxide. This mixture was then stirred with high speed stirring at a temperature of 95° C. and 50 parts of water at 100° C. was slowly added until an emulsion was formed. 100 parts of this emulsion were then added to 200 parts of a modified polyvinyl chloride latex and then films were deposited on glass plates with approximately .008" thickness. Films were completely dried and then exposed in an air oven at 300° F. for a half hour. The film with the polymer was a pale yellow color which did not change on further heating, whereas without the stabilizer the film radically changed color from yellow to gold to dark brown. Other types of emulsifiers of this general class can be used or similar non-ionic type emulsions which have no appreciable alkalinity nor develop alkalinity in the presence of water can be used as emulsifiers for our alkoxide type compounds.

In order to test the light resistance of the films obtained according to the preceding examples samples of said films were placed together with samples of the same resin compositions, prepared without the stabilizer, in a fadometer and illuminated with a mercury lamp. The samples containing the stabilizer were still unchanged after 500 hours of exposure whereas the films containing no stabilizer started already after 50 hours to become discolored.

The amount of the organo-tin dialkoxide polymers used as stabilizers will range between .5 to 5 per cent, preferably between 1 to 3 per cent by weight of the resin.

An important advantage of the new organo-tin dialkoxides is that they function as stabilizers in vinyl halide compositions made with a great variety of plasticizers; this is an excellent quality of the new stabilizers, for it is well known that the heat stability and particularly the light stability of vinyl compositions is greatly affected by the type of plasticizer present. Plasticizers which may be used in combination with the new stabilizers are, for instance, esters of the following acids: phthalic acid, adipic acid, sebacic acid, azelaic acid, citric acid, aconitic acid, tricarballic acid, maleic, fumaric, succinic, malonic acid, phosphoric acid, and mercapto acids like thioglycolic acids, and the like; esters of dihydric and polyhydric alcohols, such as glycol, glycerol, pentaerythritol, sorbitol, and the like; esters of thioglycols and other sulphur containing derivatives; amino alcohol derivatives; ester amides; sulfonamides and other amides; chlorinated plasticizers; carbonic acid derivatives derived from phosgene.

The following example illustrates the excellent stabilizing action of the organo-tin dialkoxide polymers in the presence of different types of plasticizers.

Example 10

100 parts of a vinyl composition having an intrinsic viscosity of 1.25 and consisting of 95 per cent of vinyl chloride and 5 per cent of vinyl acetate were milled on a standard rubber mill with 1 part of a dimeric dibutyl tin dimethoxide, having a melting point of 92-94° C., a tin content of 43.6% and a molecular weight of 543, and 50 parts of each of the following plasticizers:

di 2-ethylhexyl phthalate
di nonyl phthalate
di isooctyl phthalate
di butyl tetrachlorphthalate
di butoxy ethyl adipate
di 2-ethylhexyl adipate
triethylene glycol di 2-ethylhexoate After milling for forty minutes on the mill at 315° F. no appreciable discoloration was observed whereas without the stabilizer being present under the same conditions all the films were dark yellow instead of light yellow.

To test out the light stability, .003" films were sheeted out of these compositions and then exposed in the standard Atlas weatherometer for 400 hours. At the end of this time the stabilized films showed no discoloration and they retained their original flexibility and properties. Without the stabilizer such films failed and became yellow to dark brown in color in 60 to 90 hours.

In the specification and the claims, the term "alkoxy" has been used generically in many instances, as may be readily noted from the surrounding language, to embrace not only an alcohol radical of the paraffinic series but also unsaturated and substituted alkyl, aralkyl and alicyclic alcohol radicals or radicals containing hydrocarbon groups linked to each other through oxygen or sulphur. In the same way, the term "alkoxide" or "dialkoxide" is understood to embrace derivatives of saturated or unsaturated aliphatic alcohols, of ether and thioether alcohols, and of alicyclic and aralkyl alcohols wherein a H atom of the alcoholic hydroxyl groups has been replaced by the organo-tin complex. In the case of alicyclic and aralkyl alcohols members of the ring or H atoms attached thereto may be substituted by other elements or groups which do not produce side reactions.

The new organic tin compounds used in compounding the heat and light resistant plastic compositions herein set forth are claimed in our co-pending application Serial No. 29,935, filed May 28, 1948, and this application is a continuation-in-part of said application Serial No. 29,935.

Various modifications of the invention, other than specifically described herein, will be evident and are included within the scope of the appended claims.

What we claim is:

1. A heat and light resistant plastic composition including as a major constituent a halogen-containing resin and as a stabilizer a polymeric organo-tin dialkoxide of the general formula

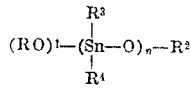

wherein $(RO)^1$ is selected from the group consisting of aliphatic alkoxy, alicyclic alkoxy and aryl alkoxy radicals, $R^2$ is the hydrocarbon residue of the $(RO)^1$ alkoxy group, $R^3$ and $R^4$ stand for members of the group consisting of alkyl and aryl, and where $n$ designates the degree of polymerization.

2. A heat and light resistant plastic composition including as a major constituent a vinyl resin containing polymerized vinyl halide and as a stabilizer a polymeric organo-tin dialkoxide of the general formula

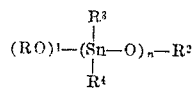

wherein $(RO)^1$ is selected from the group consisting of aliphatic alkoxy, alicyclic alkoxy and aryl alkoxy radicals, $R^2$ is the hydrocarbon residue of the $(RO)^1$ alkoxy group, $R^3$ and $R^4$ stand for members of the group consisting of alkyl and aryl, and where $n$ designates the degree of polymerization.

3. A heat and light resistant plastic composition including as a major constituent a vinyl chloride-vinyl acetate copolymer and as a stabilizer a polymeric organo-tin dialkoxide of the general formula

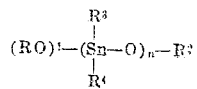

wherein $(RO)^1$ is selected from the group consisting of aliphatic alkoxy, alicyclic alkoxy and aryl alkoxy radicals, $R^2$ is the hydrocarbon residue of the $(RO)^1$ alkoxy group, $R^3$ and $R^4$ stand for members of the group consisting of alkyl and aryl, and where $n$ designates the degree of polymerization.

4. A heat and light resistant plastic composition including as a major constituent a vinylidene chloride polymer and as a stabilizer a polymeric organo-tin dialkoxide of the general formula

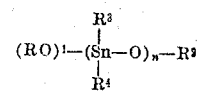

wherein $(RO)^1$ is selected from the group consisting of aliphatic alkoxy, alicyclic alkoxy and aryl alkoxy radicals, $R^2$ is the hydrocarbon residue of the $(RO)^1$ alkoxy group, $R^3$ and $R^4$ stand for members of the group consisting of alkyl and aryl, and where $n$ designates the degree of polymerization.

5. A heat and light resistant plastic composition including as a major constituent a halogen-containing resin and as a minor constituent an organo-tin compound containing in the same molecule a plurality of groups having the formula

wherein R is a hydrocarbon radical, such groups being linked to each other through their oxygen atoms.

6. A thermally stable vinyl chloride resin composition including intimately dispersed therein a stabilizing material comprising essentially a polymeric dialkyl tin dialkoxide in an amount of 0.5 to 5 per cent by weight of the resin.

7. A thermally stable vinyl chloride resin composition including intimately dispersed therein a stabilizing material comprising essentially an organo-tin polymer having the unit structure

wherein said units are directly linked to each other through the oxygen atoms and R is a hydrocarbon radical, said polymer being present in an amount of 0.5 to 5 per cent by weight of the resin.

8. A thermally stable vinyl chloride resin composition including intimately dispersed therein a stabilizing material comprising essentially an organo-tin polymer having the unit structure

wherein said units are directly linked to each other through the oxygen atoms, said polymer being present in an amount of 0.5 to 5 per cent by weight of the resin.

9. A thermally stable vinyl resin composition including polymerized vinyl halide containing intimately dispersed therein a stabilizing material comprising a polymeric dialkyl tin dialkoxide in an amount of 0.5 to 5 per cent by weight of said resin composition.

10. A thermally stable resinous composition comprising a conjoint polymer of vinyl chloride with vinyl acetate intimately combined with 0.5 to 5 per cent by weight thereof of a polymeric dibutyl tin dimethoxide.

11. As a new composition of matter, a mixture containing an organic halide plastic composition and a polymerized dialkyl tin dialkoxide in an amount of 0.5 to 5 per cent by weight of said plastic composition.

12. A heat and light resistant plastic composition including as a major constituent a halogen-containing resin and as a stabilizer a polymeric organo-tin dialkoxide.

13. A heat and light resistant plastic composition including as a major constituent a vinyl resin containing polymerized vinyl halide and as a stabilizer a polymeric organo-tin dialkoxide.

14. A heat and light resistant plastic composition including as a major constituent a vinyl chloride-vinyl acetate copolymer and as a stabilizer a polymeric organo-tin dialkoxide.

15. A heat and light resistant plastic composition including as a major constituent a vinylidene chloride polymer and as a stabilizer a polymeric organo-tin dialkoxide.

16. A heat and light resistant plastic composition including as a major constituent a vinyl resin containing polymerized vinyl halide and as a stabilizer a polymeric dialkyl tin dialkoxide.

17. A heat and light resistant plastic composition including as a major constituent a vinyl resin containing polymerized vinyl halide and as a stabilizer a polymeric dibutyl tin dialkoxide.

18. A heat and light resistant plastic composition including as a major constituent a vinyl resin containing polymerized vinyl halide and as a stabilizer a polymeric diaryl tin dialkoxide.

GERRY P. MACK.
EMERY PARKER.

REFERENCES CITED

The following references are of record in the file of this patent:

UNITED STATES PATENTS

| Number | Name | Date |
| --- | --- | --- |
| 2,267,777 | Yngve | Dec. 30, 1941 |